Patented Mar. 27, 1923.

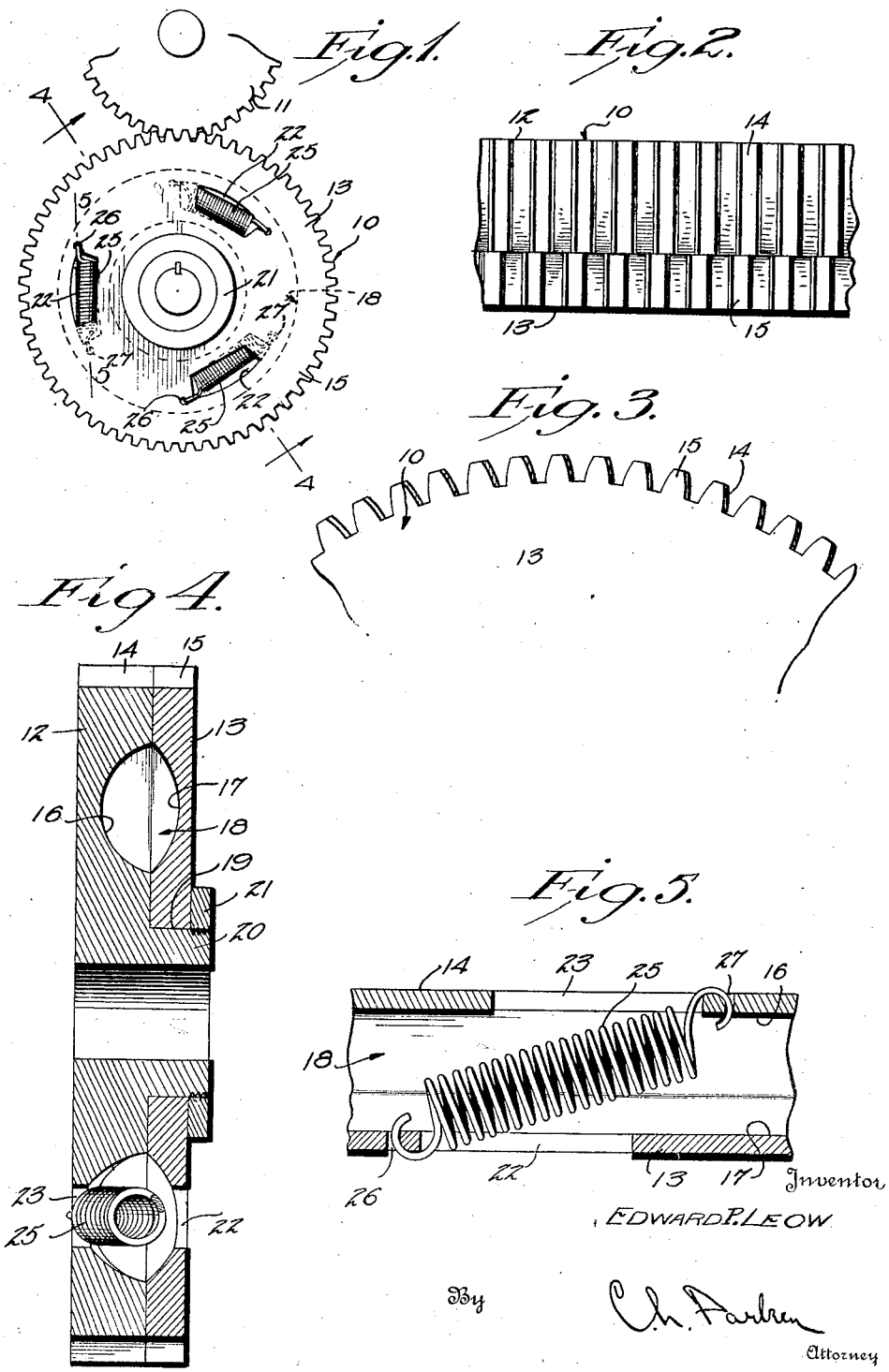

1,449,903

UNITED STATES PATENT OFFICE.

EDWARD PAUL LEOW, OF FLINT, MICHIGAN.

GEAR CONSTRUCTION.

Application filed October 9, 1922. Serial No. 593,423.

*To all whom it may concern:*

Be it known that I, EDWARD PAUL LEOW, a citizen of the United States, residing at Flint, in the county of Genesee and State of Michigan, have invented certain new and useful Improvements in Gear Constructions, of which the following is a specification.

This invention relates to gear constructions, and more particularly to a gear for use in automobiles and adapted to eliminate the usual objectionable gear noises.

In many makes of automobiles, it has been found that the gears employed to drive the valve cam shafts are objectionably noisy and it is an important object of the present invention to provide a cam shaft gear which will run in mesh with its companion gear or gears without the noise so common to such constructions. The device, however, is not limited in its application to cam shaft drives, but may be employed where it is desired to eliminate the usual gear noises.

In the drawings, I have shown one embodiment of the invention. In this showing,

Figure 1 is a face view of a gear embodying the invention, a portion of a conventional gear being shown in mesh therewith, Figure 2 is an edge view of a portion of the gear, Figure 3 is a fragmentary face view, Figure 4 is a section on line 4—4 of Figure 1, and, Figure 5 is a section taken on line 5—5 of Figure 1.

In the drawings, the reference numeral 10 designates a gear as a whole embodying the invention, the gear being shown in mesh with a second gear 11 of the conventional type. The gear embodying the present invention comprises a pair of gear sections 12 and 13 having gear teeth 14 and 15 around their peripheries. The gear section 12 is preferably wider than the gear section 13, as shown in Figure 4, and the adjacent faces of the sections are provided with annular grooves 16 and 17 respectively, forming an annular recess 18.

The gear section 13 is provided with a cylindrical axial opening 19 while the gear section 12 is provided with a longitudinally extending cylindrical axial hub portion 20 rotatably mounted within the opening 19. The outer end of the hub portion 20 is externally screw threaded for the reception of a nut 21, whereby the section 13 is maintained in its proper position upon the hub portion 20 with its inner face contacting with the adjacent face of the section 12.

The section 13 is provided with a plurality of openings 22 communicating with the recess 18 while the section 14 is provided with a similar number of openings 23 also communicating with the recess 18. Each of the openings 22 is arranged in slightly offset relation with respect to one of the openings 23 of the section 14. A plurality of springs 25 are mounted within the recess 18. The springs employed are preferably tension coil springs, as shown in Figure 5, and one end of each spring is adapted to be received in an opening 26 provided in the section 13 adjacent the opening 22, while the opposite end is adapted to be received in an opening 27 of the section 14, adjacent the opening 23.

The operation of the device is as follows:

When the device is assembled, the springs 25, exerting a tension upon each of the gear sections, tend to rotate them slightly to the position shown in Figure 3, whereby the teeth 14 and 15 of the gear sections 12 and 13 are slightly offset. When the gear is placed in mesh with its companion gear 11, the teeth of the latter tend to force the teeth 14 and 15 into alinement against the tension of the springs 25. The tension of the springs causes the teeth 14 and 15 to grip tightly against the teeth of the gear 11, thus taking up any play which might occur between the teeth of the gears 10 and 11 so that the gears may be run at relatively high speeds without the usual noise, due to the elimination of play between the parts.

It is to be understood that the form of my invention herewith shown and described is to be taken as a preferred example of the same, and that various changes in the shape, size and arrangement of parts may be resorted to without departing from the spirit of the invention or the scope of the subjoined claim.

What I claim as my invention is:

A gear comprising a pair of contacting discs having peripheral gear teeth, one of said discs having an axial opening, the other of said discs having a longitudinally extending hub portion rotatably mounted in said axial opening, the contacting faces of said discs being provided with registering annular grooves to form an annular recess, said discs being further provided in their outer faces with openings of relatively large size to permit access to said recess, the openings in said discs being arranged in substantially opposite pairs, said discs being further provided with relatively small openings adjacent said last named openings, and a tension spring mounted in said recess adjacent each pair of relatively large openings and having its opposite ends secured within said small openings to exert a relative rotating movement between said discs.

In testimony whereof I affix my signature in presence of two witnesses.

EDWARD PAUL LEOW.

Witnesses:
    Mrs. Jas. Shay,
    John F. Fisher.